US008346535B2

(12) United States Patent
Niimura (10) Patent No.: US 8,346,535 B2
(45) Date of Patent: Jan. 1, 2013

(54) INFORMATION PROCESSING APPARATUS, INFORMATION PROCESSING METHOD, AND COMPUTER PROGRAM PRODUCT FOR IDENTIFYING A LANGUAGE USED IN A DOCUMENT AND FOR TRANSLATING A PROPERTY OF THE DOCUMENT INTO THE DOCUMENT LANGUAGE

(75) Inventor: Kenji Niimura, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 965 days.

(21) Appl. No.: 11/987,641

(22) Filed: Dec. 3, 2007

(65) Prior Publication Data

US 2008/0140388 A1 Jun. 12, 2008

(30) Foreign Application Priority Data

Dec. 8, 2006 (JP) .................................. 2006-331819

(51) Int. Cl.
G06F 17/28 (2006.01)
(52) U.S. Cl. ................................. 704/2; 704/8
(58) Field of Classification Search .............. 704/2, 7
See application file for complete search history.

(56) References Cited

U.S. PATENT DOCUMENTS

| 6,092,034 | A * | 7/2000 | McCarley et al. ............. 704/2 |
| 6,092,037 | A * | 7/2000 | Stone et al. ................. 704/8 |
| 6,161,082 | A * | 12/2000 | Goldberg et al. ............. 704/3 |
| 6,463,404 | B1 * | 10/2002 | Appleby ....................... 704/9 |
| 7,110,938 | B1 * | 9/2006 | Cheng et al. ................. 704/5 |
| 7,392,519 | B2 * | 6/2008 | Nguyen et al. ............. 717/170 |
| 7,437,669 | B1 * | 10/2008 | Blakely et al. ............. 715/264 |
| 7,596,777 | B2 * | 9/2009 | Fallen-Bailey et al. ...... 717/103 |
| 7,634,397 | B2 * | 12/2009 | Suen et al. ................... 704/8 |
| 7,711,544 | B2 * | 5/2010 | McEntee et al. .............. 704/4 |
| 2003/0004703 | A1 * | 1/2003 | Prabhakar et al. ............ 704/8 |
| 2003/0135360 | A1 * | 7/2003 | Barker et al. ................ 704/8 |
| 2004/0044518 | A1 * | 3/2004 | Reed et al. ................... 704/8 |
| 2004/0138871 | A1 * | 7/2004 | Edwards et al. ............. 704/8 |
| 2005/0114145 | A1 * | 5/2005 | Janakiraman et al. ...... 704/277 |
| 2005/0177358 | A1 * | 8/2005 | Melomed et al. ............. 704/2 |
| 2005/0234702 | A1 * | 10/2005 | Komiya ....................... 704/2 |
| 2007/0244867 | A1 * | 10/2007 | Malandain et al. ........... 707/3 |
| 2009/0271176 | A1 * | 10/2009 | Bodin et al. .................. 704/2 |

FOREIGN PATENT DOCUMENTS

JP 2001-125930 5/2001
JP 2006-79712 3/2006

* cited by examiner

Primary Examiner — Douglas Godbold
(74) Attorney, Agent, or Firm — Dickstein Shapiro LLP (57) ABSTRACT

An information processing apparatus includes a registration unit for registering a property of document data, a document language identification unit for identifying a language used in the document data, a property language identification unit for identifying a language used in a property value entered with respect to the document data, and a translation unit for translating the property value entered with respect to the document data from the language used in the property value into the language used in the document data when the language used in the property value is different from the language used in the document data.

18 Claims, 7 Drawing Sheets

```
<xmp:Title>
  <rdf:Alt>
    <rdf:li  xml:lang="x-default">XMP 仕様書 </rdf:li>
    <rdf:li  xml:lang="jp-ja">XMP 仕様書 </rdf:li>
    <rdf:li  xml:lang="en-us">XMP Specification</rdf:li>
  </rdf:Alt>
</xmp:Title>
```

FIG. 8
PRIOR ART

The present patent application claims priority under 35 U.S.C. §119 from Japanese Patent Application No. 2006-331819, filed on Dec. 8, 2006 in the Japan Patent Office, the entire contents and disclosure of which are hereby incorporated by reference herein.

BACKGROUND OF THE INVENTION

1. Field of the Invention

Preferred embodiments of the present invention generally relate to a document management system, and more particularly, to an information processing apparatus, an information processing method, and a computer program product for automatically identifying a language used in document data and translating a property value of the document data from a language of the property value into a language of the document data.

2. Discussion of the Related Art

In a document management system for managing document data, metadata representing a characteristic of document data or information on document data is managed as a property of the document data. For example, as shown in FIG. 8, a document management system manages properties 31 and 32 of a document 30.

Figure 8:
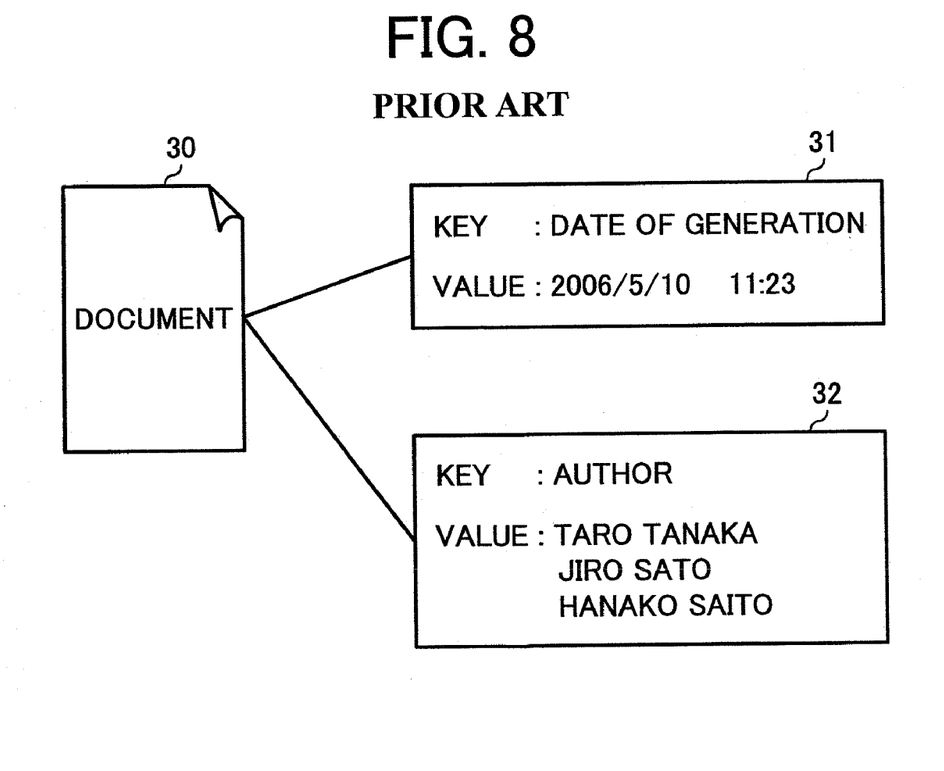
FIG. 8 is a diagram showing an example of a document and corresponding properties.

As shown in FIG. 8, the properties 31 and 32 include a key and a value. In such a property, a key includes information on a document file such as "date of generation," "author," "title," and so forth. A value includes a variety of information on a corresponding key such as a character string of a specific date, an array of character strings of names, a character string with additional information of a language, and so forth. In general, a user of a document file is accustomed to use a language used in the document file. Therefore, when a language used in a property of the document file is same as the language used in the document file, usability of a document management system may be improved.

For example, a known technique has been proposed for providing a document management system by transferring information included in a document file to another source or environment. In the document management system, each time a document file is subjected to any processing, information on the processing can be stored in the document file.

However, such a technique has a drawback in that a function to automatically identify a language used in a document file or translate a language used in a property of the document file into the language used in the document file is not included. According to the technique, when desiring to store a property of a document file in a same language as the document file, a user must undertake cumbersome procedures such as changing a language setting of each document file after examining the language of the document file, changing language settings of a group of document files written in an identical language picked up by the user, or the like. Such cumbersome procedures decrease usability of the document management system.

SUMMARY OF THE INVENTION

The present invention describes a novel information processing apparatus. In one preferred embodiment, an information processing apparatus includes a registration unit configured to register a property of document data, a document language identification unit configured to identify a language used in the document data, a property language identification unit configured to identify a language used in a property value entered with respect to the document data, and a translation unit configured to translate the property value entered with respect to the document data from the language used in the property value into the language used in the document data when the language used in the property value is different from the language used in the document data.

The present invention further describes a novel information processing method. In one preferred embodiment, an information processing method configured to register a property of document data includes the steps of identifying a language used in the document data, identifying a language used in a property value entered with respect to the document data, and translating the property value entered with respect to the document data from the language used in the property value into the language used in the document data when the language used in the property value is different from the language used in the document data.

The present invention further describes a novel computer program product stored on a computer-readable storage medium. In one preferred embodiment, a computer program product configured to cause a computer to perform the steps of registering a property of document data, identifying a language used in the document data, identifying a language used in a property value entered with respect to the document data, and translating the property value entered with respect to the document data from the language used in the property value into the language used in the document data when the language used in the property value is different from the language used in the document data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, preferred embodiments of the present invention are described. It should be noted that the present invention is not limited to any preferred embodiment described in the drawings.

Figure 1:
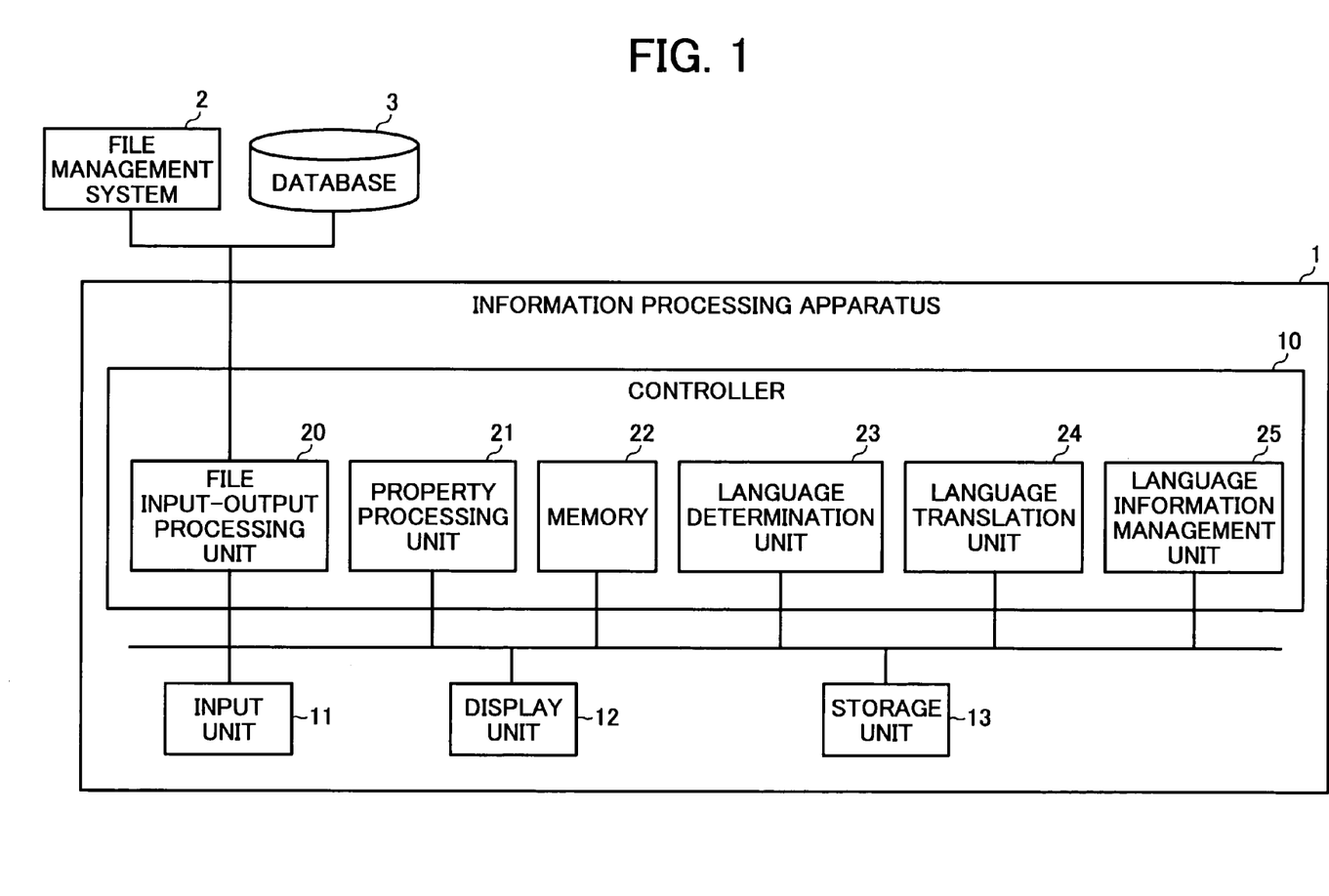
FIG. 1 is a block diagram showing a document management system including an information processing apparatus according to a preferred embodiment of the present invention.

Referring to FIG. 1, a description is given of an information processing apparatus according to a preferred embodiment of the present invention.

FIG. 1 is a block diagram showing a document management system including an information processing apparatus according to a preferred embodiment of the present invention. The document management system includes an information processing apparatus 1, a file management system 2, and a database 3.

The information processing apparatus includes a personal computer, which is a microcomputer formed of a CPU (Central Processing Unit), a ROM (Read Only Memory), and a RAM (Random Access Memory), including a controller 10, an input unit 11, a display unit 12, and a storage unit 13. The controller 10 exercises overall control of the information processing apparatus 1, performs an information processing method according to the present invention by executing a program according to the present invention, and implements functions of respective units according to the present invention. In order to cause the controller 10 to implement the functions of the respective units, the information processing apparatus can install the program thereto by reading it from a recording medium such as an optical disk or the like on which the program is recorded or by downloading it from another recording medium or a device through a network.

A file input-output processor 20 controls input-output processing of a document file (document data) to or from the file management system 2 or the database 3 and acquires a target document file to which a property is registered from the file management system 2 or the database 3. A property processor 21 serves as an interface across which a user handles (adds, deletes, acquires, and so forth) a property and performs a variety of operations such as reading or registration of a property of a document file. For example, when a property is embedded in a document file, the property processor 21 reads a property from a document file or embeds a property into a document file.

When a property of a document file is managed as a different file from the document file in the file management system 2 or the database 3, the property processor 21 reads the property of the document file from the file management system 2 or the database 3 and registers the property of the document file to the file management system 2 or the database 3. For example, when a document file is a PDF (Portable Document Format) file and metadata in an XMP (Extensible Metadata Platform) format is embedded in the PDF file as a property of the document file, the property processor 21 receives a property operation request from a user and reads or writes XMP data from or to the PDF file.

The property includes a key representing an item, a value of a character string, a numeric string, or the like, representing specific contents of the key, and additional information including language information to indicate a language used in the property or to specify a language as an enabled default language. For example, as shown in Table 1, the key includes a variety of items, from a date of generation and an author to a title of the property. The value includes a character string or a numeric string representing specific contents of the key, that is to say, a specific date, a name of the author, and a title name, respectively. The additional information includes information on each of the value.

TABLE 1

| Key | Value | Additional Information |
| --- | --- | --- |
| Date of Generation | 2006/5/10 11:23 | NONE |
| Author | Taro Tanaka | NONE |
| | Jiro Sato | NONE |
| | Hanako Saito | NONE |
| Title | XMP仕様書 | Language Information: Japanese |
| | XMP Specification | Language Information: English |

A memory 22 is a storage unit functioning as a working area for temporarily storing a variety of data including a property. A language identification unit 23 identifies a language used in a document file obtained by the file input-output processing unit and a language used in a property entered in the document file based on information of a language information management unit 25. As for a method to identify a language, a language identification unit 23 can use a commonly known technique such as a method using a circumscribed rectangle in a character line from an image of a document file, a method to acquire a language attribute of an application, or the like. Therefore, a detailed explanation of the method to identify a language is omitted herein.

A language translation unit 24 translates a property value entered in a document file from a language of the property value into a language of the document data when the language of the entered property value is different from the language of the document data based on an identification result by the language identification unit 23. As for a translation method, the language translation unit 24 can use a commonly known technique such as a method to apply word conversion based on a language dictionary that is included in the language translation unit 24 or registered by a user, or the like. Therefore, a detailed explanation of the translation method is omitted herein. The language information management unit 25, which serves as a storage unit for storing and managing language information, sets a default language or manages an available language and so forth. The file management system 2 and the database 3 accumulate and manage a document file.

Additional registration of a property value to a document file in the document management system is now described. FIGS. 2, 3, 4A, 4B, 5, and 6 are flow charts showing processing of additional registration of a property value to a document file in the document management system shown in FIG. 1.

Figure 2:
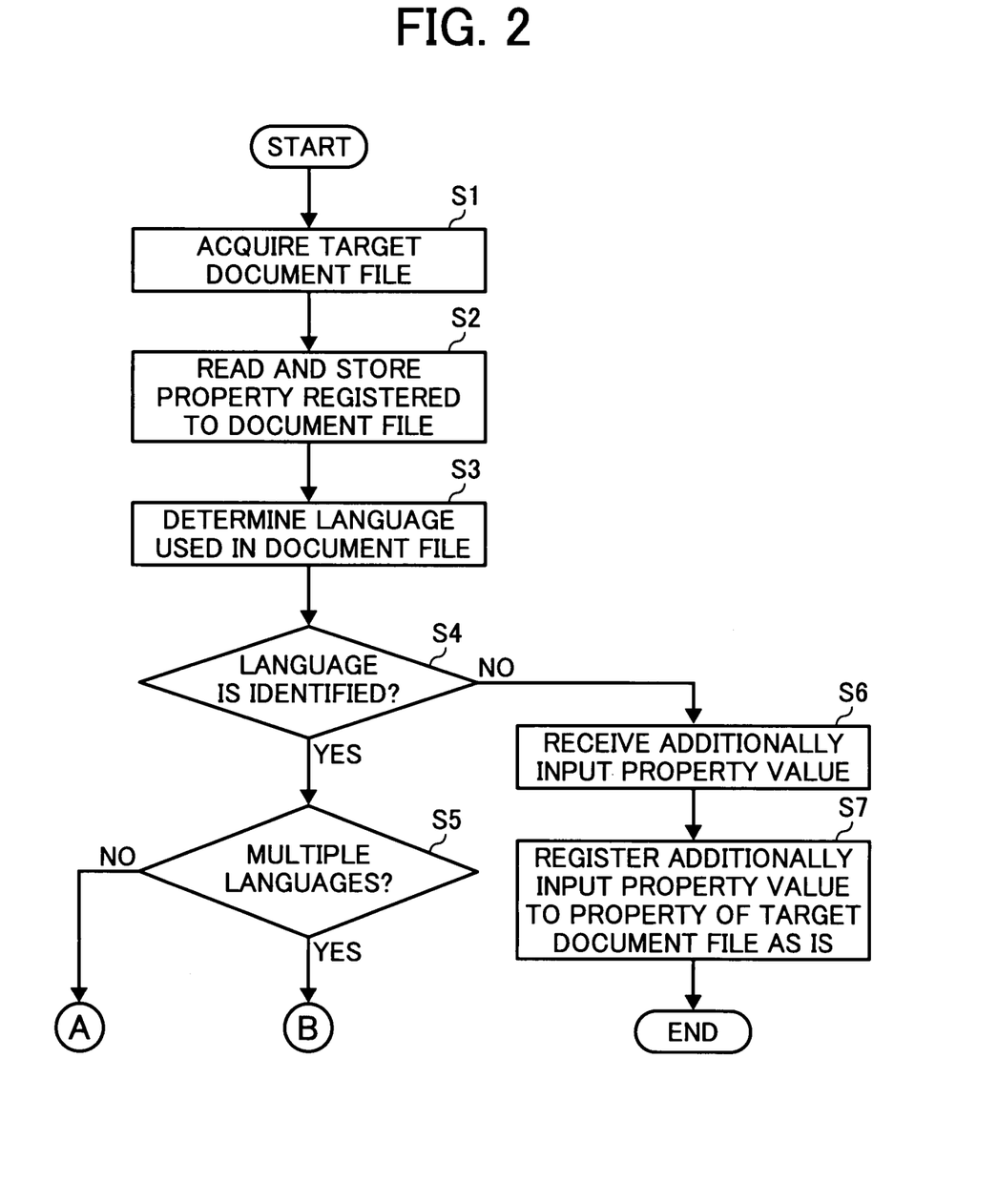
FIG. 2 is a flow chart showing processing of additional registration of a property value to a document file in the document management system shown in FIG. 1.

In the flow chart of FIG. 2, in step S1, the file input-output processing unit 20 acquires a target document file to which a property value is additionally registered from the file management system 2 or the database 3 and sends the target document file to the property processing unit 21. In step S1, when the property of the target document file is managed as a different file from the target document file, the file input-output processing unit 20 acquires the property file and sends the property file with the target document file to the property processing unit 21. Next, in step S2, the property processing unit 21 reads a property registered to the target document file and stores the property and the target document file in the memory 22.

In step S3, the language identification unit 23 identifies a language used in the target document file stored in the memory 22. Subsequently, in step S4, the property processing unit 21 determines whether or not the language used in the document file is identified based on an identification result of the language identification unit 23. Upon determining that the language is identified, the processing proceeds to step S5. Upon determining that the language is not identified, the processing proceeds to step S6. In step S6, the property processing unit 21 receives a property value additionally input by a user through the input unit 11 and stores the additionally input property value in the memory 22.

Then, in step S7, the property processing unit 21 registers the property value additionally input by the user to the property of the target document file in a language of the property value as is. When the property of the target document file is embedded in the document file, the property processing unit 21 embeds the property value additionally input by the user in the document file. When the property of the target document file is managed as another file, the file input-output processing unit 20 writes the property value additionally input by the user into the file management system 2 or the database 3 corresponding to the target document file. Thereby, the processing is terminated.

On the other hand, in step S5, the property processing unit 21 determines whether or not a plurality of languages is used in the target document file based on the identification result of the language identification unit 23. Upon determining that a plurality of languages is not used in the document file, the processing proceeds to step S11 of FIG. 3. Upon determining that a plurality of languages is used in the document file, the processing proceeds to step S31 of FIG. 4A.

Figure 3:
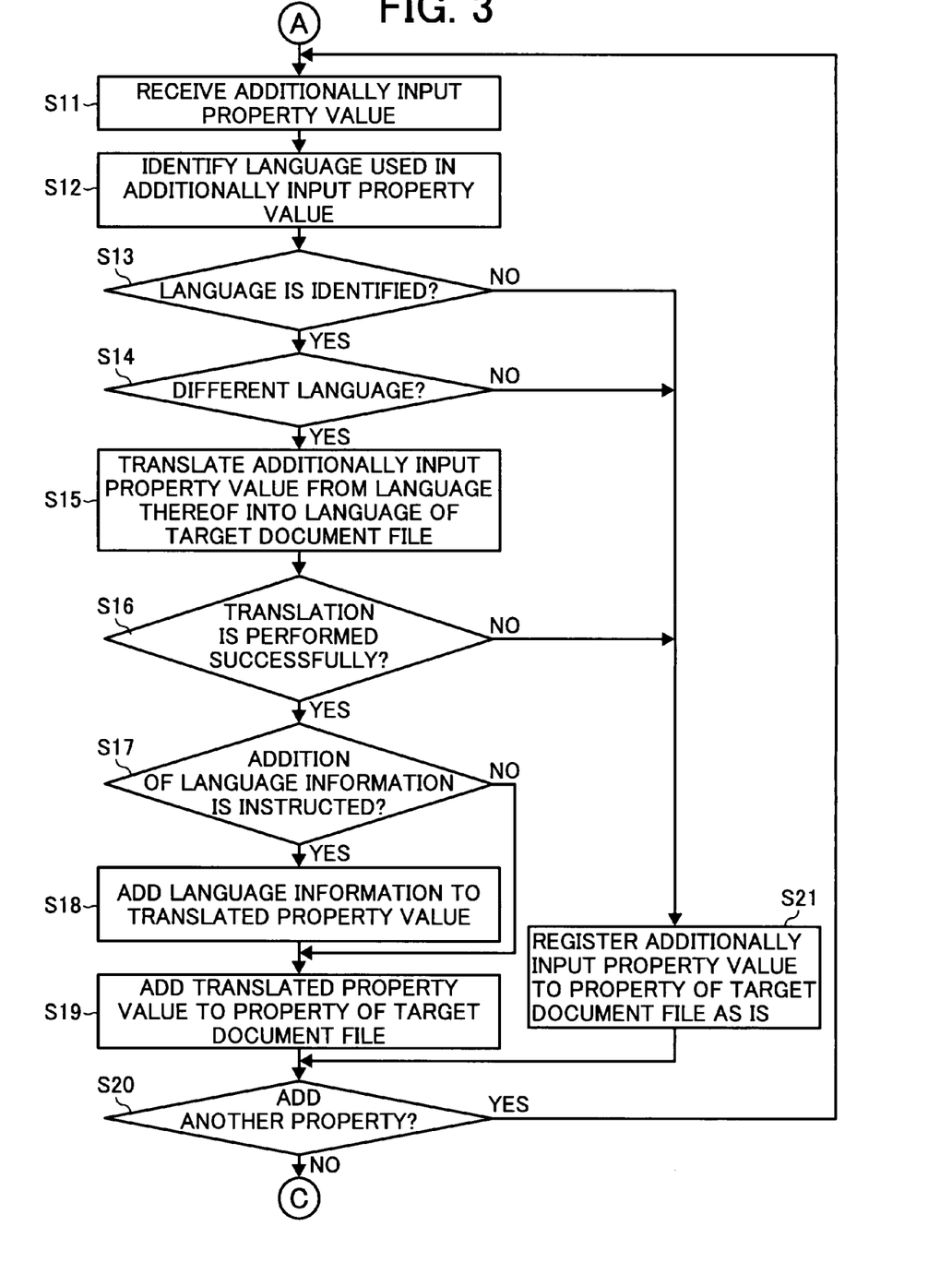
FIG. 3 is a flow chart showing processing sequential to processing shown in FIG. 2.

In step S11 of FIG. 3, the property processing unit 21 receives a property value additionally input by a user through the input unit 11 and stores the additionally input property value in the memory 22. Then, in step S12, the language identification unit 23 identifies a language used in the additionally input property value. Next, in step S13, the property processing unit 21 determines whether or not the language of the additionally input property value is identified based on an identification result of the language identification unit 23. Upon determining that the language is identified, the processing proceeds to step S14. Upon determining that the language is not identified, the processing proceeds to step S21. In step S14, the property processing unit 21 determines whether or not the language of the additionally input property value is different from the language of the document file, which has been identified in step S3. Upon determining that the language of the property value is different from the language of the document file, the processing proceeds to step S15. Upon determining that the language of the property value is not different from (is the same as) the language of the document file, the processing proceeds to step S21. In step S15, the language translation unit 24 translates the property value additionally input by the user from the language thereof into the language of the document file.

Then, in step S16, the property processing unit 21 determines whether or not the translation is successfully performed in the language translation unit 24. Upon determining that the translation is successfully performed, the processing proceeds to step S17. Upon determining that the translation is not successfully performed, the processing proceeds to step S21. In step S17, the property processing unit 21 determines whether or not the user issues an instruction to add language information to additional information of the property of the target document file through the input unit 11. Upon determining that the user does not issue the instruction, the processing proceeds to step S19. Upon determining that the user issues the instruction, the processing proceeds to step S18. In step S18, the property processing unit 21 adds the language information to the additional information corresponding to the property value translated in the language translation unit 24. Then, in step S19, the property processing unit 21 adds the translated property value with or without the language information to the property of the target document file.

In step S21, the property processing unit 21 additionally registers the property value additionally input by the user to the property of the target document file in the language of the property value as is. When the property of the target document file is embedded in the document file, the property processing unit 21 embeds the property value additionally input by the user in the document file. When the property of the target document file is managed as another file, the file input-output processing unit 20 writes the property value additionally input by the user into the file management system 2 or the database 3 corresponding to the target document file. The processing then proceeds to step S20.

In step S20, the property processing unit 21 determines whether or not another property value is added to the target document file based on an instruction by the user through the input unit 11. Upon determining that another property value is added to the target document file, the processing returns to step S11 and repeats the above-described steps. Upon determining that another property value is not added to the target document file, the processing proceeds to step S61 in FIG. 6.

Figure 4A:
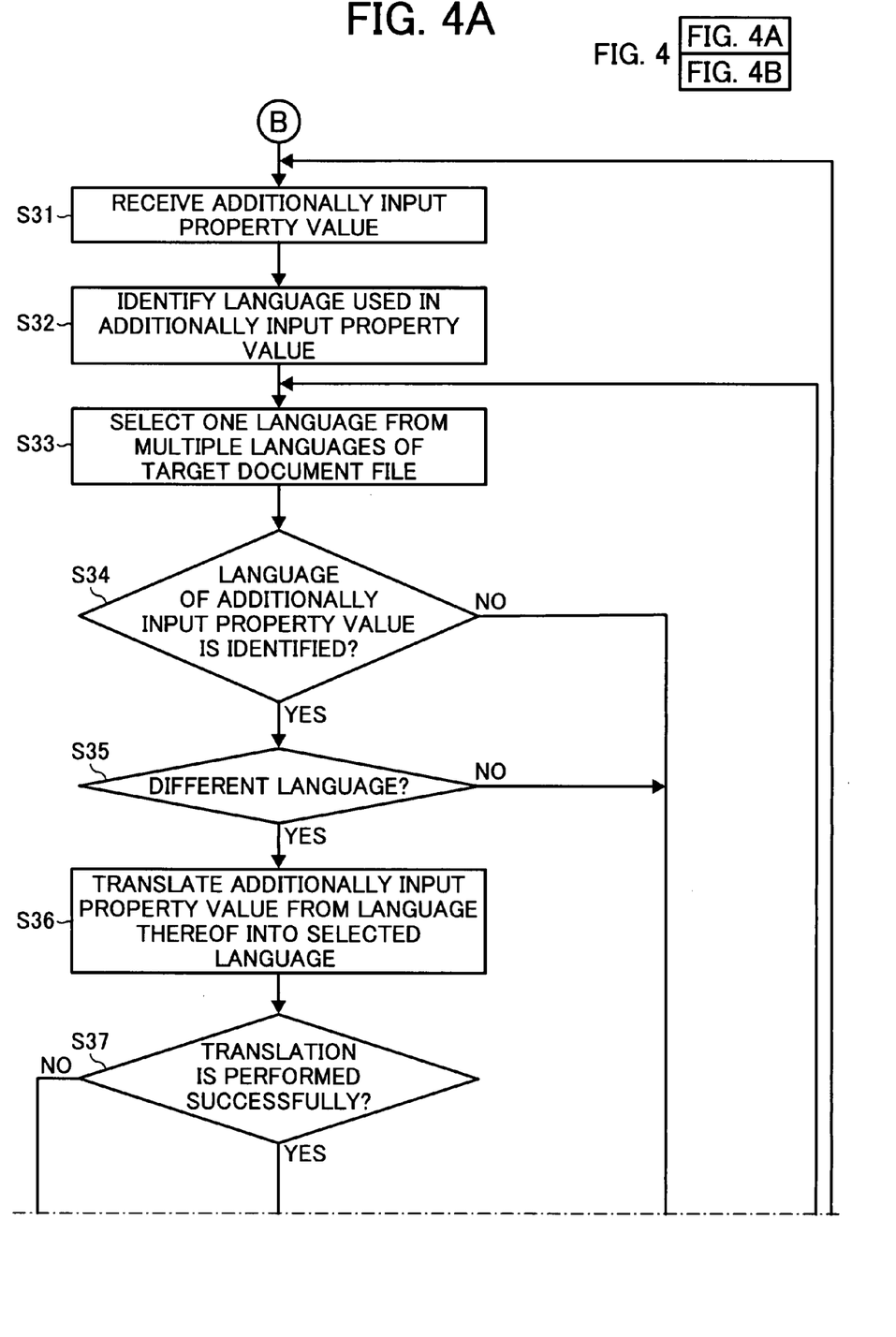
FIGS. 4A and 4B are a flow chart showing processing sequential to processing shown in FIG. 2.

In step S31 of FIG. 4A, the property processing unit 21 receives a property value additionally input by a user through the input unit 11 and stores the additionally input property value in the memory 22. Then, in step S32, the language identification unit 23 identifies a language used in the additionally input property value. Next, in step S33, the property processing unit 21 selects one language from the plurality of languages of the document file identified in step S3. Subsequently, in step S34, the property processing unit 21 determines whether or not the language of the additionally input property value is identified based on an identification result of the language identification unit 23. Upon determining that the language is identified, the processing proceeds to step S35. Upon determining that the language is not identified, the processing proceeds to step S43 of FIG. 4B.

In step S35, the property processing unit 21 determines whether or not the language of the additionally input property value is different from the language selected from the plurality of languages used in the document file in step S33. Upon determining that the language of the property value is different from the selected language, the processing proceeds to step S36. Upon determining that the language of the property value is not different from (is same as) the selected language, the processing proceeds to step S43 of FIG. 4B. In step S36, the language translation unit 24 translates the additionally input property value from the language thereof into the selected language. Then, in step S37, the property processing unit 21 determines whether or not the translation is successfully performed in the language translation unit 24. Upon determining that the translation is successfully performed, the processing proceeds to step S38 of FIG. 4B. Upon determining that the translation is not successfully performed, the processing proceeds to step S41 of FIG. 4B.

Figure 4B:
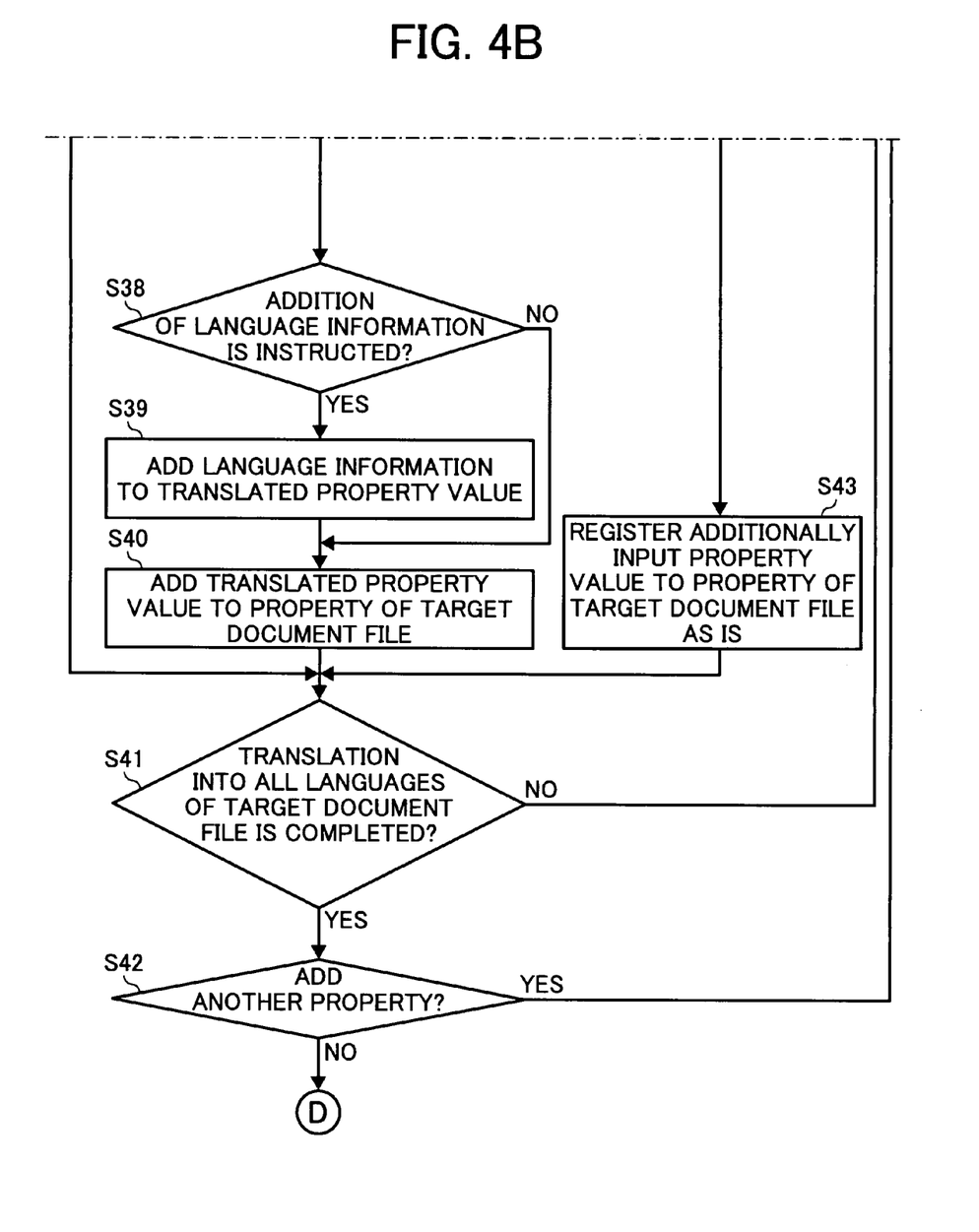

In step S38 of FIG. 4B, the property processing unit 21 determines whether or not the user issues an instruction to add language information to additional information of the property of the target document file through the input unit 11. Upon determining that the user does not issue the instruction, the processing proceeds to step S40. Upon determining that the user issues the instruction, the processing proceeds to step S39. In step S39, the property processing unit 21 adds the language information to the additional information corresponding to the property value translated in the language translation unit 24. Then, in step S40, the property processing unit 21 adds the translated property value with or without the language information to the property of the target document file, and then the processing proceeds to step S41.

In step S43, the property processing unit 21 additionally registers the property value additionally input by the user to the property of the target document file in the language of the property value as is. When the property of the target document file is embedded in the document file, the property processing unit 21 embeds the property value additionally input by the user in the document file. When the property of the target document file is managed as another file, the file input-output processing unit 20 writes the property value additionally input by the user into the file management system 2 or the database 3 corresponding to the target document file. The processing then proceeds to step S41.

In step S41, the property processing unit 21 determines whether or not translation of the property value additionally input by the user from the language thereof into all the plurality of languages of the document file is completed. Upon determining that the translation into all the plurality of languages is not completed, the processing returns to step S33 and repeats the above-described steps with respect to a language to be selected from the plurality of languages of the document file. Upon determining that the translation into all the plurality of languages is completed, the processing unit proceeds to step S42. In step S42, the property processing unit 21 determines whether or not another property value is added to the target document file based on an instruction by the user through the input unit 11. Upon determining that another property value is added to the target document file, the processing returns to step S31 and repeats the above-described steps. Upon determining that another property value is not added to the target document file, the processing proceeds to step S51 of FIG. 5.

Figure 5:
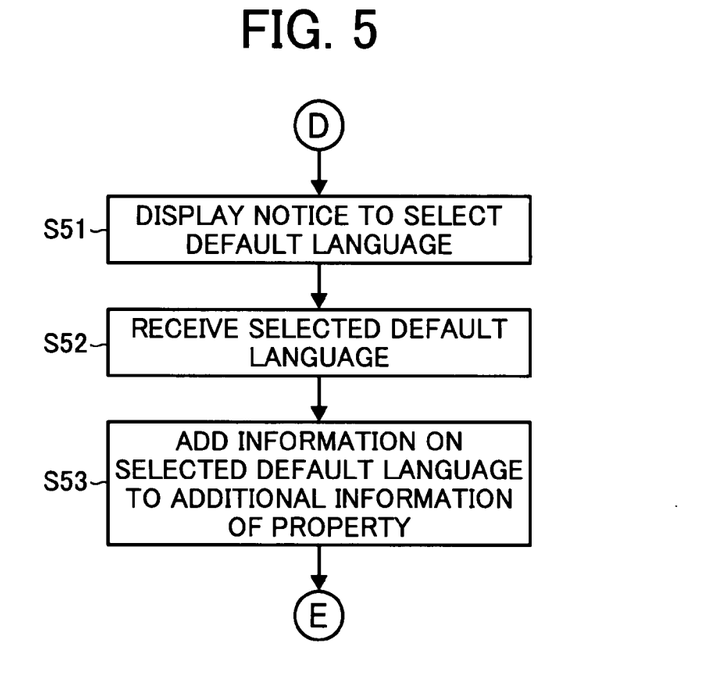
FIG. 5 is a flow chart showing processing sequential to processing shown in FIG. 4.

In step S51 of FIG. 5, the property processing unit 21 causes the display unit 12 to display a notice that allows a user to select a default language. Then, in step S52, the property processing unit 21 accepts input of the selected default language by the user through the input unit 11. Next, the property processing unit 21 adds information on the selected default language to the additional information corresponding to the property value in step S53, and the processing proceeds to step S61 of FIG. 6.

Figure 6:
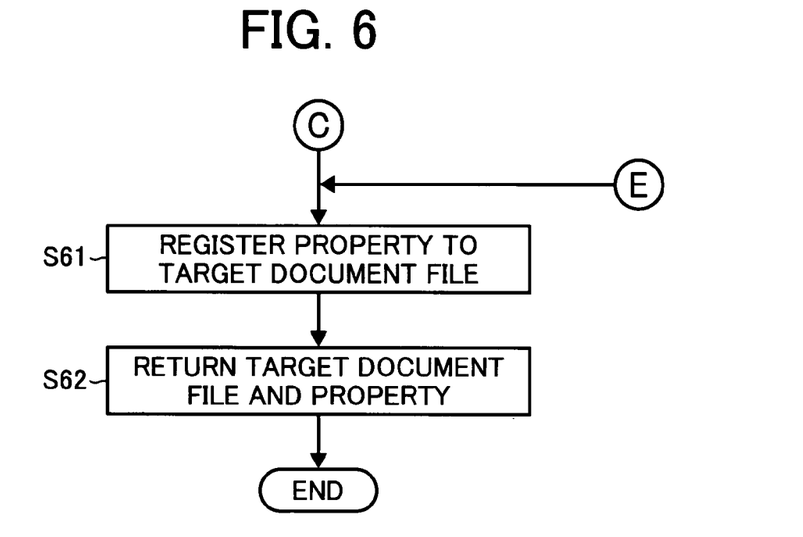
FIG. 6 is a flow chart showing processing sequential to processing shown in FIGS. 3 and 5.

In step S61 of FIG. 6, the property processing unit 21 registers the property to the target document file. When the property of the target document file is embedded in the document file, the property processing unit 21 embeds the property in the document file. When the property of the target document file is managed as another file, the property processing unit 21 associates the property with the target document file. Then, in step S62, the file input-output processing unit 20 returns the target document file and the property to the file management system 2 or the database 3. Afterwards, the processing is terminated.

By performing the above-described processing, for example, when a user enters a property value in Japanese such as {value: "コピー禁止"} in a property key such as {key: "description"} of a property of a document file whereas the document file is written in English, the property value of "コピー禁止" is translated into English such as "Copy inhibit" and registered to the document file. In another example, when a user enters "generation date: 2006/5/10," "author: 田中太郎　佐藤次郎　斉藤花子," and "title: XMP 仕様書" in Japanese as property values corresponding to respective property keys of a property of a document file whereas the document file is written in English, the property values are automatically translated into English such as "generation date: 2006/5/10," "author: Taro Tanaka Jiro Sato Hanako Saito," and "title: XMP Specification" and registered to the document file, as shown in Table 2. Further, additional information can be registered to the document file such as "language information: ENGLISH" with respect to the property key of title, which indicates that the title is written in English.

TABLE 2

| Key | Value | Additional Information |
|---|---|---|
| Date of Generation | 2006/5/10 11:23 | NONE |
| Author | Taro Tanaka | NONE |
| | Jiro Sato | NONE |
| | Hanako Saito | NONE |
| Title | XMP Specification | Language Information: ENGLISH |

Figure 7:
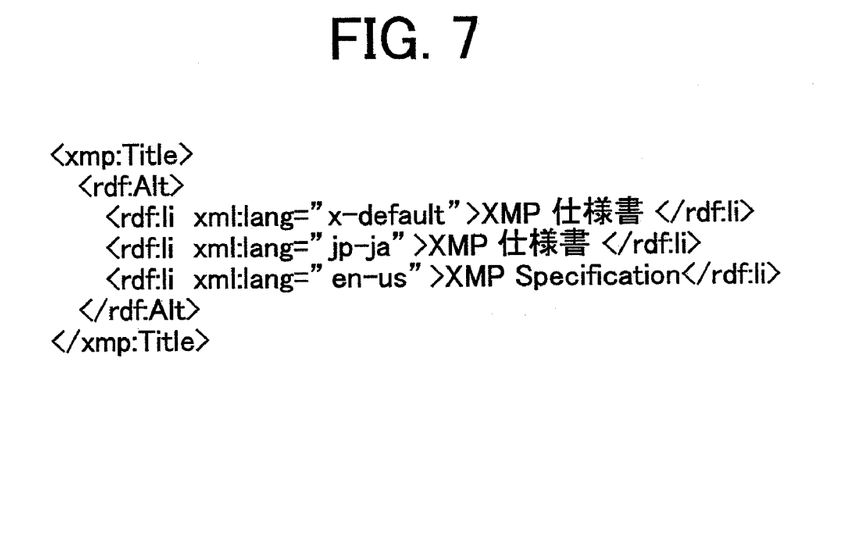
FIG. 7 shows an example of a property described in an XMP format.

Alternatively, a plurality of property values is registered to one property key in array type. For example, as shown in Table 3, both of a property value entered by a user, "title: XMP 仕様書," and a translated property value, "title: XMP Specification," can be registered to one property key, "title:." For example, when a user specifies Japanese as a default language, "default: TRUE" is registered to additional information of the property value of "title: XMP 仕様書." Thus, when the property of the document file is displayed, "title: XMP 仕様書" can be displayed. Furthermore, as shown in FIG. 7, a property can be embedded in a document file by converting the property into data in an XMP format.

TABLE 3

| Key | Value | Additional Information |
|---|---|---|
| Title | XMP仕様書 | Language Information: JAPANESE Default: TRUE |
| | XMP Specification | Language Information: ENGLISH |

As explained above, when a language of a character string of a property value entered by a user is different from a language of a document file that is automatically identified by the above-described processing, the character string entered by the user can be automatically translated into the automatically identified language by using the language translation unit and can be registered to the document file. As a result, an amount of work required to register a property value in a same language as a document file can be reduced. In addition, when a document file is written in a plurality of languages, property values can automatically be translated into each of the plurality of languages, the languages being automatically identified, and can be registered to the document file. Further, language information can be added to respective property values written in a plurality of languages. Moreover, both a property value entered by a user and a translated property value can be registered. Moreover, the user can arbitrarily select a property value written in one language as a default property value from property values written in a plurality of languages.

The document management system according to the preferred embodiment of the present invention can improve usability thereof by automatically translating a property value of a document file from a language of the property value into a language of the document file. More specifically, a user can reduce the work required to identify a language used in a property value of a document file by registering the property value corresponding to the document file using the above-described functions of automatic language identification and automatic translation. Furthermore, when property values corresponding to one property key of a document file are written in a plurality of languages, a user can specify a property value written in one language as a default property value by setting a default language of the document file. Accordingly, usability of the document management system can be improved still further, enabling a user to work more efficiently.

It should be noted that an information processing apparatus, an information processing method, and a program product according to the present invention may be applied to a variety of document management systems, electronic document processing systems, and so forth.

Further, it should be noted that the above-described embodiments are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. An information processing apparatus, comprising:
a computer comprising:
a property processing unit configured to read a property of document data associated with a stored document and register the property;
a document language identification unit configured to identify a language used in the document data of the stored document;
a property language identification unit configured to identify a language used in a property value of the registered property entered with respect to the document data; and
a translation unit configured to translate the property value entered with respect to the document data from the language used in the property value into the language used in the document data of the stored document when the language used in the property value is different from the language used in the document data of the stored document,
wherein the property processing unit is further configured to display a notice to select a default language representing language information entered with respect to a property key of the registered property, and
wherein the property processing unit comprises a registration unit configured to register information on the selected default language in association with the property value and the property key of the registered property.

2. The information processing apparatus according to claim 1, wherein said computer further comprises a multiple language translation unit configured to translate the property value entered with respect to the document data from the language used in the property value into each of a plurality of languages used in the document data when the plurality of languages are identified in the document data.

3. The information processing apparatus according to claim 2, wherein said computer further comprises a default specifying unit configured to specify a property value written in one language as a default property value by selecting the property value from the translated property values written in the plurality of languages.

4. The information processing apparatus according to claim 1, wherein said computer further comprises an addition unit configured to add language information regarding a language used in the translated property value to the translated property value, the language information being stored in association with the translated property value.

5. The information processing apparatus according to claim 1, wherein the registration unit is configured to register the entered property value in association with the translated property value.

6. An information processing method comprising the steps of:
using a computer to perform the steps of:
reading a property of document data;
displaying a notice to enter a default language representing language information entered with respect to a property key of the read property;
identifying a language used in the document data;
identifying a language used in a property value of the read property entered with respect to the document data;
registering information on the entered default language in association with the property value and the property key of the read property;, and
translating the property value entered with respect to the document data from the language used in the property value into the language used in the document data when the language used in the property value is different from the language used in the document data.

7. The information processing method according to claim 6, wherein the property value entered with respect to the document data is translated by said computer from the language used in the property value into each of a plurality of languages used in the document data when the plurality of languages are identified in the document data.

8. The information processing method according to claim 7, further comprising the step of using said computer to specify a property value written in one language as a default property value by selecting the property value from the translated property values written in the plurality of languages.

9. The information processing method according to claim 6, further comprising the step of using said computer to store language information regarding a language used in the translated property value in association with the translated property value.

10. The information processing method according to claim 6, further comprising the step of using said computer to register the entered property value in association with the translated property value.

11. A computer program product stored on a non-transitory computer-readable storage medium and configured, when run on an information processing apparatus, to cause a computer to perform the steps of:
read a property of document data;
register the property of the document data;
displaying a notice to enter a default language representing language information entered with respect to a property key of the registered property,
identifying a language used in the document data;
identifying a language used in a property value of the registered property entered with respect to the document data;
registering information on the entered default language in association with the property value and the property key of the registered property; and
translating the property value entered with respect to the document data from the language used in the property value into the language used in the document data when the language used in the property value is different from the language used in the document data.

12. The computer program product according to claim 11, wherein the property value entered with respect to the document data is translated from the language used in the property value into each of a plurality of languages used in the document data when the plurality of languages are identified in the document data.

13. The computer program product according to claim 12, configured to cause a computer to perform the step of specifying a property value written in one language as a default property value by selecting the property value from the translated property values written in the plurality of languages.

14. The computer program product according to claim 11, configured to cause a computer to perform the step of storing language information regarding a language used in the translated property value in association with the translated property value.

15. The computer program product according to claim 11, configured to cause a computer to perform the step of registering the entered property value in association with the translated property value.

16. The information processing apparatus according to claim 1, wherein the registration unit is configured to register the entered property value with the property of document data as is when the language used in the document data associated with the stored document cannot be identified.

17. The information processing method according to claim 6, further comprising the step of using the computer to register the entered property value with the property of document data as is when the language used in the document data cannot be identified.

18. The computer program product according to claim 11, further comprising the step of causing the computer to perform the step of registering the entered property value with the property of document data as is when the language used in the document data cannot be identified.

* * * * *